United States Patent [19]

Shimura

[11] Patent Number: 4,860,337

[45] Date of Patent: Aug. 22, 1989

[54] RAPID PROCESSING OF IMMEDIATELY SUCCESSIVE ARRIVAL SIGNALS IN A BASE STATION OF A RADIO COMMUNICATION NETWORK

[75] Inventor: Yukihiro Shimura, Tokyo, Japan

[73] Assignee: NEC Corporation, Tokyo, Japan

[21] Appl. No.: 213,866

[22] Filed: Jun. 30, 1988

[30] Foreign Application Priority Data

Jun. 30, 1987 [JP] Japan .............................. 62-160961

[51] Int. Cl.$^4$ ............................................. H04Q 7/04
[52] U.S. Cl. ...................................... 379/63; 379/61; 379/58; 455/34
[58] Field of Search ...................... 379/56, 58, 61, 63; 455/33, 34, 54, 56

[56] References Cited

U.S. PATENT DOCUMENTS

| | | | |
|---|---|---|---|
| 4,462,113 | 7/1984 | Iwata | 455/20 |
| 4,553,262 | 11/1985 | Coe | 455/15 |
| 4,568,800 | 2/1986 | Orikasa | 379/63 |
| 4,659,878 | 4/1987 | Dinkins | 370/71 |
| 4,679,225 | 7/1987 | Higashiyama | 379/62 |
| 4,706,272 | 11/1987 | Nishimura et al. | 379/57 |
| 4,716,407 | 12/1987 | Burras et al. | 340/825.04 |
| 4,741,019 | 4/1988 | Takahashi | 379/61 |
| 4,741,049 | 4/1988 | DeJagger et al. | 455/32 |
| 4,744,101 | 5/1988 | Saegusa | 379/61 |
| 4,754,473 | 6/1988 | Edwards | 379/58 |
| 4,761,806 | 8/1988 | Toki | 379/61 |
| 4,768,220 | 8/1988 | Yoshihara et al. | 379/63 |
| 4,776,001 | 10/1988 | Murata et al. | 379/62 |
| 4,792,984 | 12/1988 | Matsmo | 455/32 |

Primary Examiner—Robert Lev
Attorney, Agent, or Firm—Sughrue, Mion, Zinn, Macpeak & Seas

[57] ABSTRACT

A base station (10), in a radio communication network having at least two telephone lines (111 to 11n) and a plurality of radio telephone sets (121 to 12m), includes radio transceivers (131 to 13k) capable of selecting one of a control channel and a plurality of communication channels. A producing arrangement (16, 141, to 14n) is coupled between the radio telephone lines and the radio transceivers for producing, in response to a first arrival signal arriving at one of the telephone lines, a first call signal which is sent by a first selected transceiver through a first selected channel towards the radio telephone sets. The first selected channel is selected from the idle channels of the communication channels by a selecting arrangement (16 and 17). Responsive to a second arrival signal arriving at another of the telephone lines while the first call signal is sent through the first selected channel, the producing arrangement adds a channel code of a different one of the idle channels to make the first selected transceiver send the first call signal and the channel code of the different one of the idle channels over the first selected channel. In this manner, traffic is reduced on a control channel and the base station can rapidly respond to an arrival signal which arrives while the base station is sending a call signal.

10 Claims, 1 Drawing Sheet

RAPID PROCESSING OF IMMEDIATELY SUCCESSIVE ARRIVAL SIGNALS IN A BASE STATION OF A RADIO COMMUNICATION NETWORK

BACKGROUND OF THE INVENTION

This invention relates to a base station for use in a radio communication network. This invention relates also to a radio communication network which includes the base station.

A radio communication network of the type described, comprises a base or fixed station, at least two telephone lines, and a plurality of radio telephone sets which are not less in number than the telephone lines. The telephone lines may be subscriber lines extended from a central exchange of a central station. Alternatively, the telephone lines may be extension lines which are extended from a private branch exchange. Each radio telephone set may be a mobile telephone set, a cordless telephone set, or the like.

A conventional base station comprises radio transceivers which are not less in number than the above-mentioned radio telephone lines. A station controlling device is coupled to the telephone lines for controlling the radio transceivers to connect the telephone lines to the radio telephone sets through a control channel and a plurality of communication channels which are not less in number than the telephone lines and are given channel codes, respectively. The communication channels are speech channels or data channels.

Responsive to a first arrival signal arriving at one of the telephone lines, the station controlling device selects one of idle transceiver and one of transceivers as a first selected transceiver and one of idle channels as a first selected channel. Subsequently, the station controlling device makes the first selected transceiver send the first arrival signal and the channel code of the first selected channel through the control channel towards the radio telephone sets.

Thereafter, the station controlling device produces a first call signal and makes the first selected transceiver send the first wall signal through the first selected channel towards the radio telephone sets. More specifically, such a call signal is a tone generator driving signal, namely, a well driving signal.

Each of the radio telephone sets comprises a tone generator, namely, a bell, responsive to the tone generator driving signal for generating a call tone. Thus, the radio telephone sets generate call tones, respectively, in response to the first call signal received through the first selected channel after reception of the first arrival signal and the channel code of the first selected channel through the control channel. One of the radio telephone sets, which generate the respective call tones, transmits a response or off-hook signal through the first selected channel to the first selected transceiver when the above-mentioned one of the radio telephone sets comes to an off-hook state.

Responsive to the response signal, the base station stops sending the first call signal through the first selected channel towards the radio telephone sets. Thereafter, the base station connects the above-mentioned one of the telephone lines to the above-mentioned one of the radio telephone sets through the first selected channel so that the above-mentioned one of the radio telephone sets can communicate a communication signal, such as a speech signal or a data signal, with the above-mentioned one of the telephone lines through the first selected channel.

It will be assumed that the base station receives a second arrival signal arriving at a different one of the telephone lines while the first call signal is sent through the first selected channel towards the radio telephone sets. In this case, the base station receives the second arrival signal before the base station stops, in response to the response signal, sending the first call signal. When the base station receives the second arrival signal, the base station waits for reception of the response signal. When the response signal is received, the base station connects the above-mentioned one of the radio telephone sets to the above-mentioned one of the radio telephone sets through the first selected channel and, thereafter, selects another one of the idle channels as a second selected channel to send the second arrival signal and the channel code of the second selected channel through the control channel. The base station is, therefore, incapable of rapidly responding to an arrival signal received from a telephone line immediately after reception of a preceding arrived signal from another telephone line.

Thus, the conventional base station uses the control channel to send an arrival signal whenever the arrival signal is received. Such an arrival signal is sent regardless of whether or not the base station sends the call signal through the first selected channel towards the radio telephone sets at that time. As a result, he control channel is frequently used and traffic of the control channel is increased.

SUMMARY OF THE INVENTION

It is therefore an object of this invention to provide a base station which is capable of rapidly responding to an arrival signal received from a telephone line immediately after reception of a preceding arrival signal from another telephone line.

It is another object of this invention to provide a base station of the type described, which is capable of rapidly responding to an arrival signal which arrives while the base station sends a call signal.

It is still another object of this invention to provide a base station of the type described, by which a control channel is less frequently used.

It is yet another object of this invention to provide a base station of the type described, which is capable of decreasing traffic of the control channel.

It is a further object of this invention to provide a radio communication network which is capable of rapidly responding to an arrival signal received from a telephone line immediately after reception of a preceding arrival signal from another telephone line.

It is a still further object of this invention to provide a radio communication network of the type described, by which a control channel is less frequently used.

It is a yet further object of this invention to provide a radio communication network of the type described, which is capable of decreasing traffic of the control channel.

A base station to which this invention is applicable is for use in a radio communication network comprising first and second telephone lines and a plurality of radio telephone sets, not less in number than the telephone lines. The base station comprises radio transceivers, not less in number than the telephone lines, and station controlling means coupled to the telephone lines for controlling the radio transceivers to connect the telephone lines to the radio telephone sets through a control channel and a plurality of communication channels which are not less in number than the telephone lines and are given channel codes, respectively. The station controlling means includes selecting means coupled to the telephone lines and the radio transceivers and responsive to a first arrival signal arriving at the first telephone line for selecting one of idle transceivers among the radio transceivers as a first selected transceiver and one of idle channels among the communication channels as a first selected channel to make the first selected transceiver send the first arrival signal and the channel code of the first selected channel through the control channel towards the radio telephone sets, and producing means coupled to the telephone lines, the selecting means, and the radio transceivers and responsive to the first arrival signal for producing a first call signal to make the first selected transceiver send the first call signal through the first selected channel towards the radio telephone sets after the first arrival signal and the channel code of the first selected channel are sent through the control channel towards the radio telephone sets. According to this invention, the producing means is furthermore for making the selecting means select another of the idle channels as a second selected channel in response to a second arrival signal arriving at the second telephone line while the first call signal is sent through the first selected channel towards the radio telephone sets, the producing means adding the channel code of the second selected channel to the first call signal to make the first selected transceiver send the first call signal and the channel code of the second selected channel through the first selected channel towards the radio telephone sets.

This invention is applicable also to a radio communication network comprising a base station, first and second telephone lines, and a plurality of radio telephone sets, not less in number than the telephone lines. The base station comprises radio transceivers, not less in number than the telephone lines, and station controlling means coupled to the telephone lines for controlling the radio transceivers to connect the telephone lines to the radio telephone sets through a control channel and a plurality of communication channels which are not less in number than the telephone lines and are given channel codes, respectively. The station controlling means includes selecting means coupled to the telephone lines and the radio transceivers and responsive to a first arrival signal arriving at the first telephone line for selecting one of idle transceivers among the radio transceivers as a first selected transceiver and one of idle channels among the communication channels as a first selected channel to make the first selected transceiver send the first arrival signal and the channel code of the first selected channel through the control channel towards the radio telephone sets, and producing means coupled to the telephone lines, the selecting means, and the radio transceivers and responsive to the first arrival signal for producing a first call signal to make the first selected transceiver send the first call signal through the first selected channel towards the radio telephone sets after the first arrival signal and the channel code of the first selected channel are sent through the control channel towards the radio telephone sets. According to this invention, the producing means is furthermore for making the selecting means select another of the idle channels as a second selected channel in response to a second arrival signal arriving at the second telephone line while the first call signal is sent through the first selected channel towards the radio telephone sets, the producing means adding the channel code of the second selected channel to the first call signal to make the first selected transceiver send the first call signal and the channel code of the second selected channel through the first selected channel towards the radio telephone sets.

DESCRIPTION OF THE PREFERRED EMBODIMENT

Figure 1:
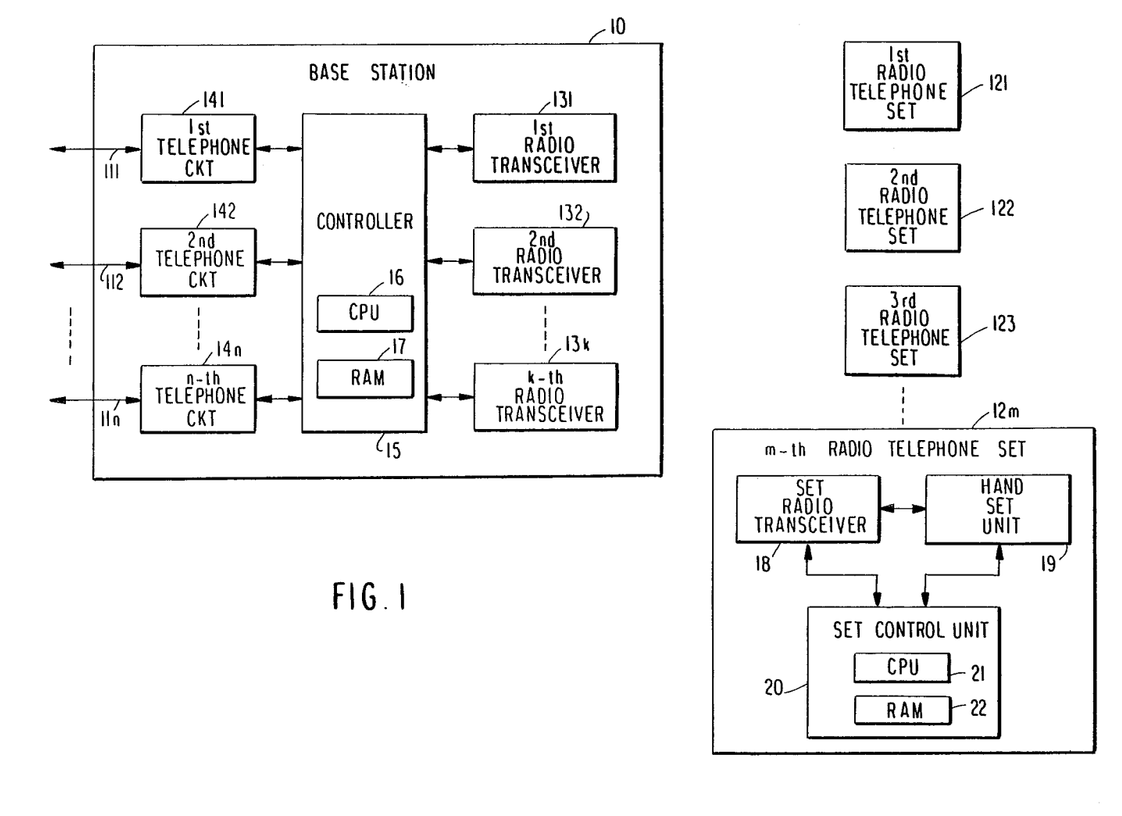
FIG. 1 is a block diagram of a radio communication network comprising a base station according to an embodiment of this invention.

Referring to FIG. 1, a base station 10 according to a preferred embodiment of this invention is for use in a radio communication network comprising first through n-th telephone lines 111, 112, . . . , and 11$n$, where n represents an integer greater than one, and first through m-th radio telephone sets 121, 122, 123, and 12$m$ which are not less in number than the telephone lines 111 to 11$n$ and are identifiable by set codes, respectively. The first through the n-th telephone lines 111 to 11$n$ are connected to an exchange (not shown), such as either a central exchange or a private branch exchange.

The base station 10 comprises first through k-th radio transceivers 131, 132, . . . , and 13$k$, not less in number than the telephone lines 111 to 11$n$, and first through n-th telephone circuits or networks 141, 142, and 14$n$ which are equal in number to the telephone lines 111 to 11$n$ and are connected to the respective telephone lines 111 to 11$n$.

A controller 15 is connected to the telephone circuits 141 to 14$n$ to control the radio transceivers 131 to 13$k$ and the telephone circuits 141 to 14$n$ to connect the radio transceivers 131 to 13$k$ to the radio telephone sets 121 to 12$m$ through a control channel and a plurality of communication channels. The communication channels are not less in number than the telephone lines 111 to 11$n$ and are given channel codes, respectively. More specifically, the controller 15 comprises a CPU (central processing unit) 16 and an RAM (random access memory) 17. Under the control of the CPU 16, the controller 15 controls the radio transceivers 131 to 13$k$. Operation of the RAM 17 will become clear as the description proceeds.

Each of the telephone circuits 141 to 14$n$ is operable in the known manner and serves as a line interface portion between each of the telephone lines 111 to 11$n$ and the controller 15.

The number k of the radio transceivers 131 to 13$k$ is selected to become equal to or greater than the number n of the telephone lines 111 to 11$n$ so that all of the first through the n-th telephone lines 111 to 11$n$ can simultaneously be connected to radio telephone sets which are equal in number to all of the first through the n-th telephone lines 111 to 11n among the first through the m-th radio telephone sets 121 to 12m. Relationship between the number k of the radio transceivers 131 to 13k and the number m of the radio telephone sets 121 to 12m is decided in consideration of traffic of the control and the communication channels.

At any rate, the controller 15 is operable, in combination with the telephone circuits 141 to 14n, as a station controlling device coupled to the telephone lines 111 to 11n for controlling the radio transceivers 131 to 13k to connect the telephone lines 111 to 11n to the radio telephone sets 121 to 12m through the control and the communication channels.

Attention will be directed to the radio telephone set 12m. Each of other radio telephone sets 12 (suffixes omitted) has the same structure and the same operation. The radio telephone set 12m comprises a set radio transceiver 18 which is similar to each of the first through the k-th radio transceivers 131 to 13k and is operable in the similar manner. A hand set unit 19 is connected to the set radio transceiver 18 and comprises a set (not shown) of speaker and microphone. A set control unit 20 is connected to the set radio transceiver 18 and the hand set unit 19 to control the set radio transceiver 18 and the hand set unit 19. The set control unit 20 also comprises a CPU 21 and an RAM 22. Under the control of the CPU 21, the set control unit 20 controls the set radio transceiver 18 and the hand set unit 19. Operation of the RAM 22 will become clear as the description proceeds.

Figure 2:
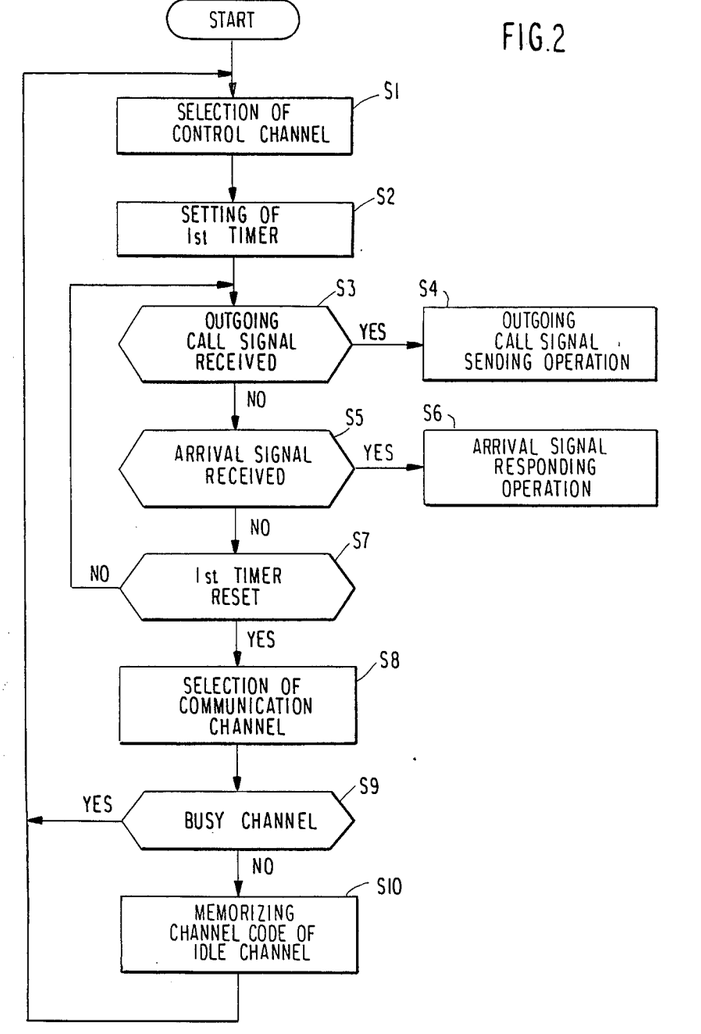
FIG. 2 is a flow chart for use in describing operation of the radio communication network illustrated in FIG. 1.

Referring to FIG. 2 in addition to FIG. 1, description will be made as regards operation of the base station 10.

When a power source switch (not shown) of the base station 10 is closed and put into an on-state, the controller 15 of the base station 10 is put into a waiting state and starts waiting operation illustrated in FIG. 2. In the waiting state, the CPU 16 of the controller 15 controls one of the radio transceivers 131 to 13k to make the above-mentioned one of the radio transceivers 131 to 13k select the control channel at a first stage S1 so that the controller 15 can receive a radio signal, such as an outgoing call signal, transmitted through the control channel. The outgoing call signal will presently be described.

The first stage S1 proceeds to a second stage S2 at which a first timer (not shown) of the controller 15 is set by the CPU 16 of the controller 15. The first timer is reset a predetermined time duration after the first timer is set. The predetermined time duration is, for example, one second long. The second stage S2 is followed by a third stage S3.

At the third stage S3, the CPU 16 of the controller 15 judges whether or not the controller 15 receives the outgoing call signal transmitted from one of the radio telephone sets 121 to 12m through the control channel. When the outgoing call signal is received, the third stage S3 is followed by a fourth stage S4. At the fourth stage S4, the CPU 16 of the controller 15 carries out outgoing call signal sending operation to send the outgoing call signal to the exchange through one of the telephone lines 111 to 11n in the manner known in the art. When the outgoing call signal is not received, the third stage S3 proceeds to a fifth stage S5.

At the fifth stage S5, the CPU 16 of the controller 15 judges whether or not the controller 15 receives an arrival signal sent from the exchange through any one of the telephone lines 111 to 11n. When the arrival signal is received, the fifth stage S5 proceeds to a sixth stage S6. At the sixth stage S6, the CPU 16 of the controller 15 carries out arrival signal responding operation which will later be described. When the arrival signal is not received, the fifth stage S5 is followed by a seventh stage S7.

At the seventh stage S7, the CPU 16 of the controller 15 judges whether or not the first timer is reset. When the first timer is not yet reset, operation returns to the third stage S3. When the first timer is already reset, the seventh stage S7 proceeds to an eighth stage S8.

At the eighth stage S8, the CPU 16 of the controller 15 controls the above-mentioned one of the radio transceivers 131 to 13k to make this radio transceiver select one of the communication channels so that the controller 15 can receive another radio signal, such as a communication signal, transmitted through a selected one of the communication channels. In this event, one of the communication channels is selected from all of the communication channels either at random or in a predetermined order. The communication signal is either a speech signal or a data signal as will later be described. The eighth stage S8 is followed by a ninth stage S9.

At the ninth stage S9, the CPU 16 of the controller 15 judges whether or not the controller 15 receives the communication signal through the selected one of the communication channels. In other words, the CPU 16 of the controller 15 judges whether or not the selected one of the communication channels is a busy channel. When the controller 15 receives the radio signal through the selected one of the communication channels, the CPU 16 of the controller 15 judges that the selected one of the communication channels is a busy channel and the ninth stage S9 returns back to the first stage S1. When the radio signal is no received through the selected one of the communication channels, the CPU 16 of the controller 15 judges that the selected one of the communication channels is not a busy channel. That is, the CPU 16 of the controller 15 judges that the selected one of the communication channels is an idle channel. At this time, the ninth stage S9 proceeds to a tenth stage S10.

At the tenth stage S10, the CPU 16 of the controller 15 stores the channel code of the selected one of the communication channels into the RAM 17. As a result, the RAM 17 memorizes the channel code of the idle channel. The tenth stage S10 returns back to the first stage S1.

Thus, the channel codes of idle channels among the communication channels are memorized in the RAM 17 as a memorized contents until the controller 15 receives either the outgoing call signal or the arrival signal.

Figure 3:
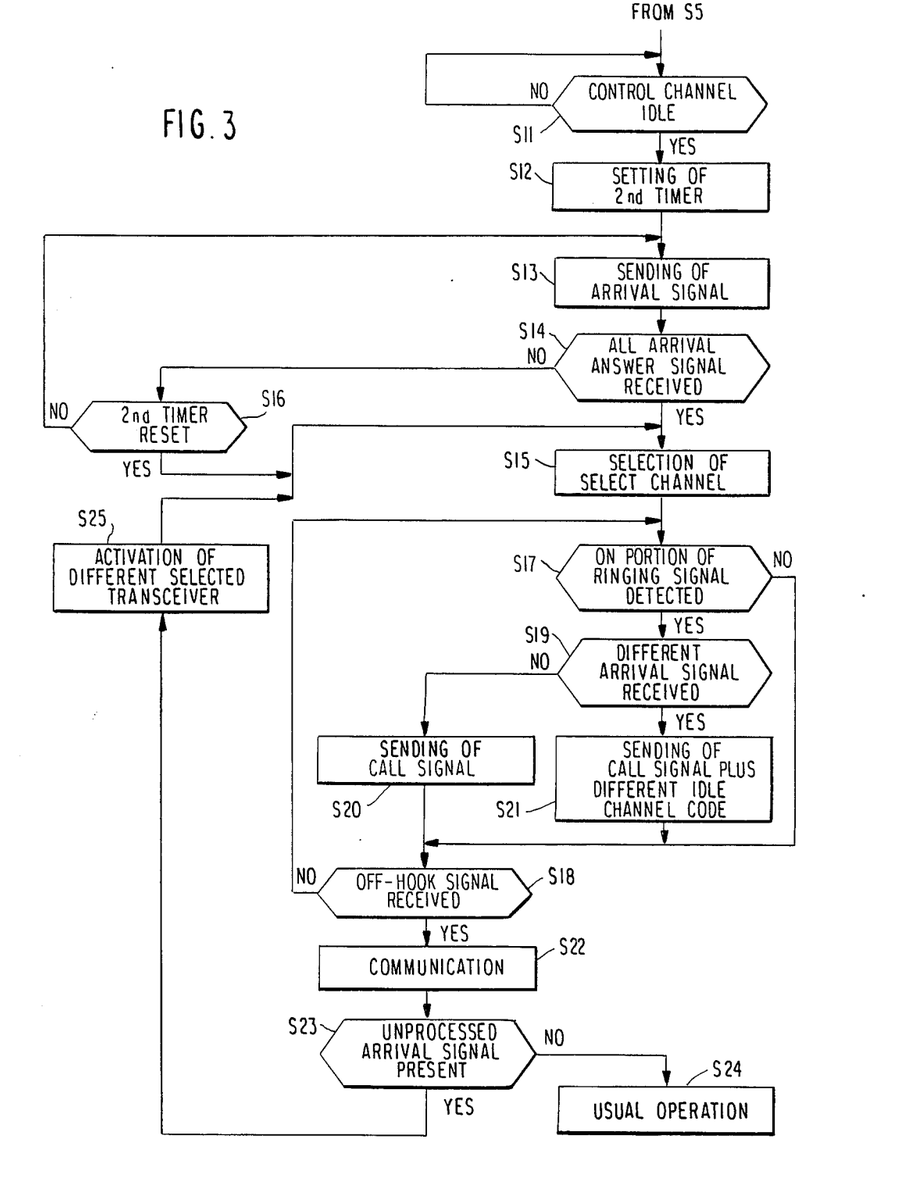
FIG. 3 is another flow chart for use in describing another operation of the radio communication network illustrated in FIG. 1.

Referring to FIG. 3 together with FIG. 1, description will proceed to the arrival signal responding operation of the base station 10.

It will be supposed that the base station 10 receives a first arrival signal from the first telephone line 111.

When the controller 15 of the base station 10 receives the first arrival signal from the first telephone line 111, the fifth stage S5 (FIG. 2) is followed by an eleventh stage S11.

At the eleventh stage S11, the CPU 16 of the controller 15 of the base station 10 judges whether or not the control channel is idle in the manner known in the art. When the control channel is busy, the eleventh stage S11 is repeatedly carried out until the control channel becomes idle. The eleventh stage S11 proceeds to a twelfth stage S12.

At the twelfth stage S12, a second timer (not shown) of the controller 15 is set by the CPU 16 of the controller 15. The second timer is reset a preselected time duration after the second timer is set. The preselected time duration is, for example, four seconds long. The twelfth stage S12 is followed by a thirteenth stage S13.

At the thirteenth stage S13, the CPU 16 of the controller 15 of the base station 10 selects one of idle transceivers among the radio transceivers 131 to 13k as a first selected transceiver and selects one of idle channels among the communication channels as a first selected channel with reference to the memorized content of the RAM 17.

The CPU 16 thereafter makes the first selected transceiver send the first arrival signal, the channel code of the first selected channel, and the set code of the first radio telephone set 121 through the control channel towards the radio telephone sets 121 to 12m. Subsequently, the CPU 16 makes the first selected transceiver send the first arrival signal, the channel code of the first selected channel, and the set code of the second radio telephone set 122 through the control channel. Likewise, the first arrival signal, the channel code of the first selected channel, and the set code of the m-th radio telephone set 12m are finally sent from the base station 10 towards the radio telephone sets 121 to 12m through the control channel.

Thus, the CPU 16 serves, in combination with the RAM 16 and the telephone circuits 141 to 14n, as a selecting arrangement at the thirteenth stage S13. The selecting arrangement is coupled to the telephone lines 111 to 11n and the radio transceivers 131 to 13k and responsive to a first arrival signal arriving at one of the telephone lines 111 to 11n for selecting one of idle transceivers among the radio transceivers 131 to 13k as a first selected transceiver and one of idle channels among the communication channels as a first selected channel to make the first selected transceiver send the first arrival signal and the channel code of the first selected channel through the control channel towards the radio telephone sets 121 to 12m.

The thirteenth stage S13 proceeds to a fourteenth stage S14 at which the CPU 16 judges whether or not the first selected transceiver receives, through the control channel, arrival answer signals transmitted from all of the radio telephone sets 121 to 12m. The arrival answer signals are transmitted by radio telephone sets each of which receives through the control channel the first arrival signal, the channel code of the first selected channel, and the set code representative of the radio telephone set in question. In other words, each of the radio telephone sets 121 to 12m transmits through the control channel the arrival answer signal when the first arrival signal, the channel code of the first selected channel, and the set code specific to the radio telephone set under consideration are received. In this event, each of the radio telephone sets 121 to 12m transmits the arrival answer signal comprising the set code of the radio telephone set in question.

When the first selected transceiver of the base station 10 receives, through the control channel, the arrival answer signals transmitted from all of the radio telephone sets 121 to 12m, the fourteenth stage S14 is followed by a fifteenth stage S15 at which the CPU 16 of the base station 10 makes the first selected transceiver select the first selected channel. When the first selected transceiver can not receive the arrival answer signals transmitted from all of the radio telephone sets 121 to 12m, the fourteenth stage S14 proceeds to a sixteenth stage S16 at which the CPU 16 of the controller 15 judges whether or not the second timer is reset. When the second timer is not yet reset, the sixteenth stage S16 returns to the thirteenth stage S13. When the second timer is already reset, the sixteenth stage S16 proceeds to the fifteenth stage S15.

The fifteenth stage S15 is followed by a seventeenth stage S17. At the seventeenth stage S17, the CPU 16 of the controller 15 checks whether or not an on or signalling portion is detected in a ringing signal. The ringing signal is transmitted from the exchange to the controller 15 through the first telephone line 111 and the first telephone circuit 141 after the exchange transmits the first arrival signal to the first telephone line 111. The ringing signal has the on or signalling portion of an alternating or pulsating current of a predetermined frequency of, for example, sixteen hertz and an off or pause portion interposed between two successive on portions. Each off portion has no alternating or pulsating current. For example, each off portion lasts two seconds and each on portion, one second.

Thus, the CPU 16 carries out judgement whether or not the on portion of the ringing signal is detected at the seventeenth stage S17. When a result of the judgement is negative, the seventeenth stage S17 proceeds to an eighteenth stage S18 which will later be described. When the result of the judgement is affirmative, the seventeenth stage S17 is followed by a nineteenth stage S19.

At the nineteenth stage S19, the CPU 16 judges whether or not the controller 15 receives a different arrival signal received from a different one of the telephone lines 111 to 11n through a corresponding one of the telephone circuits 141 to 14n. When the controller 15 does not receive the different arrival signal, the nineteenth stage S19 proceeds to a twentieth stage S20 which will presently be described. Otherwise, operation proceeds to a twenty-first stage S21 which will later be described.

At the twentieth stage S20, the CPU 16 of the controller 15 produces, in response to the ringing signal, a first call signal and makes the first selected transceiver send the first call signal through the first selected channel towards the radio telephone sets 121 to 12m. Such a call signal signifies a tone generator driving signal, namely, a bell driving signal. The first call signal has also an on or signalling portion corresponding to the on portion of the ringing signal and an off or pause portion corresponding to the off portion of the ringing signal. Each of the telephone sets 121 to 12m comprises a tone generator or a bell (not shown). The call tone generator generates a call tone in response to the first call signal in the manner which will later be described.

Thus, the CPU 16 serves, in combination with the telephone circuits 141 to 14n, as a producing arrangement at the twentieth stage S20. The producing arrangement is coupled to the telephone lines 111 to 11n, the selecting arrangement, and the radio transceivers 131 to 13k and responsive to the first arrival signal for producing a first call signal to make the first selected transceiver send the first call signal through the first selected channel towards the radio telephone sets 121 to 12m after the first arrival signal and the code of the first selected channel are sent through the control channel towards the radio telephone sets 121 to 12m.

The twentieth stage S20 is followed by the eighteenth stage S18. At the eighteenth stage S18, the CPU 16 judges whether or not the first selected transceiver receives a response or off-hook signal through the first selected channel. The response or off-hook signal is transmitted by one of the radio telephone sets 121 to 12m through the first selected channel to the first selected transceiver when the above-mentioned one of the radio telephone sets 121 to 12m comes to an off-hook state in response to the first call signal received through the first selected channel after reception of the first arrival signal and the channel code of the first selected channel through the control channel. The off-hook signal comprises the set code of the above-mentioned one of the radio telephone sets 121 to 12m.

When the off-hook signal is not yet received, the eighteenth stage S18 returns to the seventeenth stage S17. When the first selected transceiver receives the off-hook signal, the CPU 16 makes the first selected transceiver stop sending the first call signal through the first selected channel towards the radio telephone sets 121 to 12m. Thereafter, the eighteenth stage S18 proceeds to a twenty-second stage S22 which will later be described.

When the controller 15 receives the different arrival signal at the nineteenth stage S19, operation proceeds to the twenty-first stage S21 as mentioned above. It will be assumed that the base station 15 receives the different arrival signal from the second telephone line 112 as a second arrival signal. At the twenty-first stage S21, the CPU 16 selects, with reference to the memorized content of the RAM 17, another of the idle channels as a second selected channel in response to the second arrival signal and adds the channel code of the second selected channel to the first call signal to make the first selected transceiver send the first call signal and the channel code of the second selected channel through the first selected channel towards the radio telephone sets 121 to 12m.

The twenty-first stage S21 proceeds to the above-mentioned eighteenth stage S18 at which the CPU 16 judges whether or not the controller 15 receives the response or off-hook signal.

It is apparent from the above that the CPU 16 serves also as the producing arrangement at the twenty-first stage S21 and the eighteenth stage S18. In this event, the producing arrangement is furthermore for making the selecting arrangement select another of the idle channels as a second selected channel in response to a second arrival signal arriving at a different one of the telephone lines 111 to 11n while the first call signal is sent through the first selected channel towards the radio telephone sets 121 to 12m. The producing arrangement subsequently adds the channel code of the second selected channel to the first call signal to make the first selected transceiver send the first call signal and the channel code of the second selected channel through the first selected channel towards the radio telephone sets 121 to 12m.

In this event, the producing arrangement makes the first selected transceiver send the first call signal and the channel code of the second selected channel through the first selected channel towards the radio telephone sets 121 to 12m until the first selected transceiver receives the response or off-hook signal through the first selected channel.

More specifically, the producing arrangement is for making the first selected transceiver stop sending the first call signal and the channel code of the second selected channel through the first selected channel towards the radio telephone sets 121 to 12m when the first selected transceiver receives the response signal through the first selected channel.

Attention will now be directed to the twenty-second stage S22. At the twenty-second stage S22, the CPU 16 produces a communication allowance signal when the controller 15 receives the off-hook signal from one of the radio telephone sets 121 to 12m at the eighteenth stage S18. The communication allowance signal comprises the set code of the above-mentioned one of the radio telephone sets 121 to 12m. The CPU 16 thereafter makes the first selected transceiver send the communication allowance signal through the first selected channel towards the radio telephone sets 121 to 12m. The communication allowance signal is called an "audio frequency on" signal in the art. Subsequently, the CPU 16 makes the first selected transceiver connect the first telephone line 111 to the above-mentioned one of the radio telephone sets 121 to 12m through the first selected channel. The CPU 16 thereby allows a communication signal, such as a speech signal or a data signal, to be interchanged between the above-mentioned one of the radio telephone sets 121 to 12m and the first telephone line 111 through the first selected channel and the first transceiver when the above-mentioned one of the radio telephone sets 121 to 12m receives the communication allowance signal. As a result, arrival signal processing comes to an end for the first arrival signal.

It will be apparent from the above that the CPU 16 is operable as the producing arrangement even at the twenty-second stage S22. In this case, the producing arrangement is responsive to the response signal comprising the set code of the above-mentioned one of the radio telephone sets 121 to 12m for producing a communication allowance signal comprising the set code of the above-mentioned one of the radio telephone sets 121 to 12m to make the first selected transceiver send the communication allowance signal through the first selected channel towards the radio telephone sets 121 to 12m after the producing arrangement makes the first selected transceiver stop sending the first call signal and the channel code of the second selected channel through the first selected channel.

The producing arrangement is for controlling the first selected transceiver to connect the above-mentioned one of the telephone lines 111 to 11n to the above-mentioned one of the radio telephone sets 121 to 12m through the first selected channel after the communication allowance signal is sent through the first selected channel towards the radio telephone sets 121 to 12m.

The producing arrangement thereby allows a communication signal to be interchanged between the above-mentioned one of the radio telephone sets 121 to 12m and the above-mentioned one of the telephone lines 111 to 11n through the first selected channel and the first selected transceiver when the above-mentioned one of the radio telephone sets 121 to 12m receives the communication allowance signal.

The twenty-second stage S22 is followed by a twenty-third stage S23 at which the CPU 16 carries out judgement whether or not there is an unprocessed arrival signal for which the arrival signal processing is not yet carried out. When a result of the judgement is negative, the twenty-third stage S23 proceeds to a twenty-fourth stage S24 at which the CPU 16 carries out a usual operation in the manner known in the art. When the result of the judgement is affirmative, the twenty-third stage S23 is followed by a twenty-fifth stage S25.

At the twenty-fifth stage S25, the CPU 16 selects another of the idle transceivers as a second selected transceiver with reference to the memorized content of the RAM 17 and activates the second selected transceiver. The twenty-fifth stage S25 returns to the fifteenth stage S15.

At the fifteenth stage S15, the CPU 16 makes the second selected transceiver select the second selected channel. The fifteenth stage S15 is followed by the seventeenth stage S17 at which the CPU 16 carries out judgement whether or not the on portion is detected in the ringing signal. The ringing signal is continuously transmitted by the exchange until the arrival signal processing comes to an end for the second arrival signal after the arrival signal processing is completed for the first arrival signal. When a result of the judgement is affirmative, the seventeenth stage S17 proceeds to the nineteenth stage S19. Otherwise, the seventeenth stage S17 proceeds to the eighteenth stage S18 at which operation is made in a similar manner as described above.

At the nineteenth stage S19, the CPU 16 judges whether or not the controller 15 receives a next arrival signal which succeeds the second arrival signal.

When the controller 15 does not receive the next arrival signal, the nineteenth stage S19 is followed by the twentieth stage S20. At the twentieth stage S20, the CPU 16 produces a second call signal to make the second selected transceiver send the second call signal through the second selected channel towards the radio telephone sets 121 to 12m. The twentieth stage S20 is followed by the eighteenth stage S18 at which operation is made in a similar manner as described above.

When the controller 15 receives the next arrival signal, the nineteenth stage S19 is followed by the twenty-first stage S21 at which the CPU 16 makes the second selected transceiver send the second call signal and the channel code of still another one of the idle channel through the second selected channel towards the radio telephone sets 121 to 12m in a similar manner as described above. The twenty-first stage S21 is followed by the eighteenth stage S18 at which operation is made in a similar manner as described above.

It will be apparent from the above that the CPU 16 is operable as the producing arrangement even at the twenty-third stage S23 and the twenty-fifth stage S25. In this case, the producing arrangement is for making the selecting arrangement select another of the idle transceivers as a second selected transceiver after the producing arrangement controls the first selected transceiver to connect the above-mentioned one of the lines 111 to 11n to the above-mentioned one of the radio telephone sets 121 to 12m through the control channel. Thereafter, the producing arrangement produces a second call signal at the twentieth stage S20 to make the second selected transceiver send the second call signal through the second selected channel towards the radio telephone sets 121 to 12m.

The second call signal is received by other telephone sets which are kept in an on-hook state among the radio telephone sets 121 to 12m in spite of reception of the first call signal and the channel code of the second selected channel through the first selected channel after reception of the first arrival signal and the channel code of the first selected channel through the control channel and which come, in response to the communication allowance signal received through the first selected channel, to a receivable state where the second call signal can be received through the second selected channel.

Figure 4:
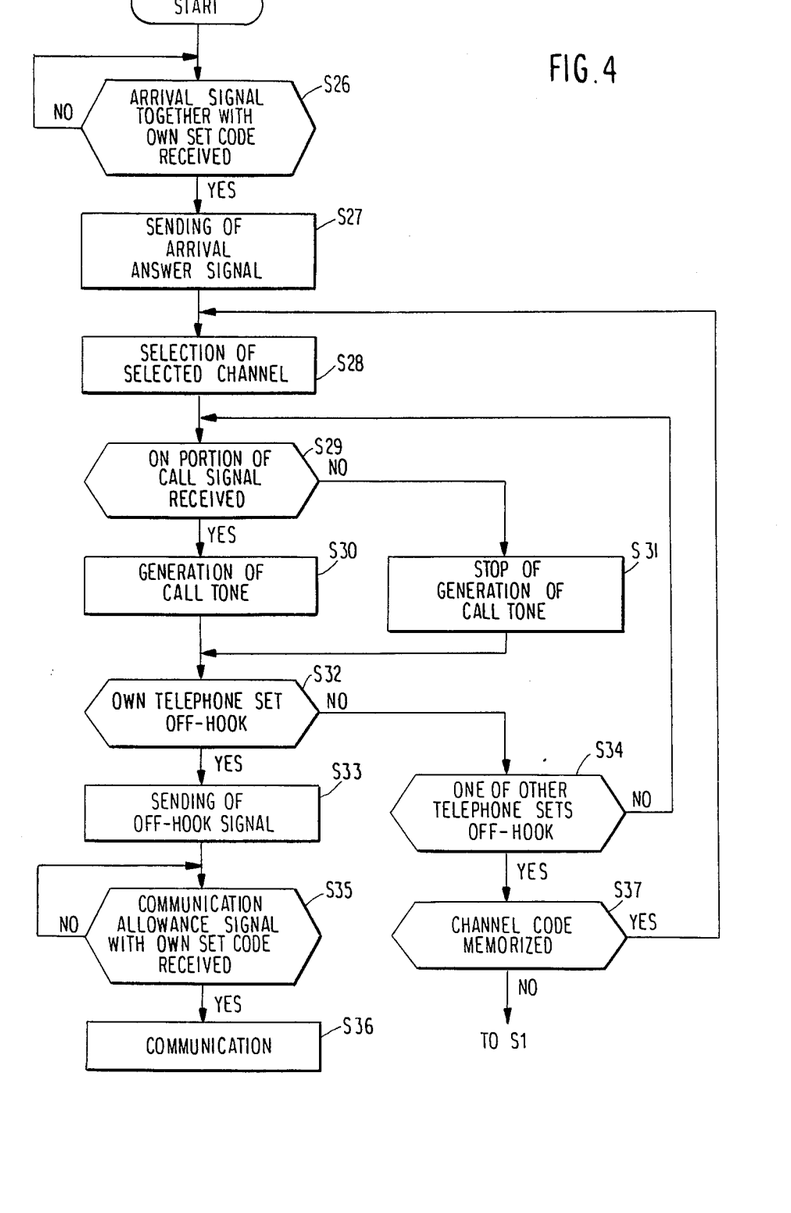
FIG. 4 is still another flow chart for use in describing still another operation of the radio communication network illustrated in FIG. 1.

Referring to FIG. 4 in addition to FIG. 1, operation of the m-th radio telephone set 12m will be described more in detail.

Although operation will hereinafter be described only as regards the m-th radio telephone set 12m among the radio telephone sets 121 to 12m merely for brevity of description, each of other radio telephone sets is operable in a manner similar to the m-th radio telephone set 12m.

It will be assumed that a power source switch (not shown) of the m-th radio telephone set 12m is already closed and that the RAM 22 memorizes no information. It will also be assumed that the m-th radio telephone set 12m is put into a receivable state where the radio signal can be received through the control channel. That is, the CPU 21 of the set control unit 20 of the radio telephone set 12m already controls the set radio transceiver 18 so as to select the control channel.

The CPU 21 of the set control unit 20 of the m-th radio telephone set 12m judges at a twenty-sixth stage S26 whether or not the set radio transceiver 18 of the m-th radio telephone set 12m receives a combination of the first arrival signal, the channel code of the first selected channel, and the set code specific to the m-th radio telephone set 12m through the control channel. When the set radio transceiver 18 does not receive the combination of the first arrival signal, the channel code of the first selected channel, and the set code specific to the m-th radio telephone set 12m, the twenty-sixth stage S26 is repeatedly carried out until the set radio transceiver 18 receives the combination of the first arrival signal, the channel code of the first selected channel, and the set code specific to the m-th radio telephone set 12m. The twenty-sixth stage S26 is followed by a twenty-seventh stage S27.

At the twenty-seventh stage S27, the CPU 21 of the set control unit 20 makes the set radio transceiver 18 send, through the control channel, an arrival answer signal comprising the set code of the m-th radio telephone set 12m. The twenty-seventh stage S27 proceeds to a twenty-eighth stage S28.

At the twenty-eighth stage S28, the CPU 21 makes the set radio transceiver 18 select the first selected channel. The twenty-eighth stage S28 is followed by a twenty-ninth stage S29.

At the twenty-ninth stage S29, the CPU 21 carries out judgement whether or not the set radio transceiver 18 receives the on portion of the first call signal through the first selected channel. When the set radio transceiver 18 receives the on portion of the first call signal, the twenty-ninth stage S29 proceeds to a thirtieth stage S30 which will presently be described. Otherwise, the twenty-ninth stage S29 proceeds to a thirty-first stage S31 which will also presently be described.

At the thirtieth stage S30, the CPU 21 controls to supply the on portion of the first call signal to a tone generator (not shown) and to thereby make the tone generator generate a call tone. In addition, the CPU 21 stores the channel code of the second selected channel into the RAM 22 only when the set radio transceiver 18 receives not only the first call signal but also the channel code of the second selected channel. In this case, the channel code of the second selected channel is memorized in the RAM 22 as a memorized content. The thirtieth stage S30 is followed by a thirty-second stage S32 which will presently be described.

At the thirty-first stage S31, the CPU 21 controls to stop supplying the first call signal to the tone generator and to thereby make the tone generator stop generating the call tone. The thirty-first stage S31 is also followed by the thirty-second stage S32.

At the thirty-second stage S32, the CPU 21 carries out judgement whether or not the m-th radio telephone set 12m comes to an off-hook state. When a result of the judgement is affirmative, the thirty-second stage S32 proceeds to a thirty-third stage S33 which will presently be described. When the result of the judgement is negative, the thirty-second stage S32 proceeds to a thirty-fourth stage S34 which will later be described.

At the thirty-third stage S33, the CPU 21 produces an off-hook or response signal to make the set radio transceiver 18 send the off-hook signal through the first selected channel to the first selected transceiver of the base station 10. The off-hook signal comprises the set code of the m-th radio telephone set 12m as described above. Simultaneously, the CPU 21 erases the memorized RAM 22. That is, the memorized content is erased from the RAM 22 when the m-th radio telephone set 12m comes to the off-hook state. The thirty-third stage S33 is followed by a thirty-fifth stage S35.

At the thirty-fifth stage S35, the CPU 21 judges whether or not the set radio transceiver 18 receives, through the first selected channel, a communication allowance signal comprising the set code specific to the m-th radio telephone set 12m. When the communication allowance signal is not received, the thirty-fifth stage S35 is repeatedly carried out until the communication allowance signal is received. The thirty-fifth stage S35 proceeds to a thirty-sixth stage S36.

At the thirty-sixth stage S36, the m-th radio telephone set 12m is allowed to communicate, through the first selected channel and the base station 10, a communication signal with one of the telephone lines 111 to 11n that receives the first arrival signal.

Attention will now be directed to the thirty-fourth stage S34. At the thirty-fourth stage S34, the CPU 21 judges whether or not the set radio transceiver 18 receives, through the first selected channel, a communication allowance signal comprising the set code of one of other radio telephone sets. In other words, judgement is made whether or not one of other radio telephone sets comes to an off-hook state. When a result of the judgement is negative, the thirty-fourth stage S34 returns to the twenty-ninth stage S29. When the result of the judgement is affirmative, the thirty-fourth stage S34 proceeds to a thirty-seventh stage S37.

At the thirty-seventh stage S37, the CPU 21 carries out judgement with reference to the memorized content of the RAM 22 whether or not a channel code is memorized in the RAM 22. When a result of the judgement is negative, the thirty-seventh stage S37 returns to the first stage S1 (FIG. 2) described above. When the result of the judgement is affirmative, the thirty-seventh stage S37 returns to the twenty-eighth stage S28. At the twenty-eighth stage S28, the CPU 21 makes the set radio transceiver 18 select a communication channel represented by the channel code which is memorized in the RAM 22. When a plurality of channel codes are memorized in the RAM 22, the CPU 21 selects the oldest one from the channel codes memorized in the RAM 22 and, thereafter, makes the set radio transceiver 18 select a communication channel represented by the oldest one of the channel codes which are memorized in the RAM 22. Subsequently, the CPU 21 erases from the RAM 22 the channel code of the communication channel which the set radio transceiver 18 selects. The twenty-eighth stage S28 is followed by the twenty-ninth stage S29 in a similar manner as described above.

What is claimed is:

1. In a base station for use in a radio communication network comprising first and second telephone lines and a plurality of radio telephone sets, said base station comprising radio transceivers, and station controlling means coupled to said telephone lines for controlling said radio transceivers to connect said telephone lines to said radio telephone sets through a control channel and a plurality of communication channels which are given channel codes, respectively, said station controlling means including selecting means coupled to said telephone lines and said radio transceivers and responsive to a first arrival signal arriving at said first telephone line for selecting one of idle transceivers among said radio transceivers as a first selected transceiver and one of idle channels among said communication channels as a first selected channel to make said first selected transceiver send said first arrival signal and the channel code of said first selected channel through said control channel towards said radio telephone sets, and producing means coupled to said telephone lines, said selecting means, and said radio transceivers and responsive to said first arrival signal for producing a first call signal to make said first selected transceiver send said first call signal through said first selected channel towards said radio telephone sets, the improvement wherein:

said producing means is furthermore for making said selecting means select another of said idle channels as a second selected channel in response to a second arrival signal arriving at said second telephone line while said first call signal is sent through said first selected channel towards said radio telephone sets, said producing means adding the channel code of said second selected channel to said first call signal to make said first selected transceiver send said first call signal and the channel code of said second selected channel through said first selected channel towards said radio telephone sets.

2. A base station as claimed in claim 1, wherein said producing means makes said first selected transceiver send said first call signal and the channel code of said second selected channel through said first selected channel towards said radio telephone sets until said first selected transceiver receives a response signal through said first selected channel, said response signal being transmitted by one of said radio telephone sets through said first selected channel to said first selected transceiver when said one of the radio telephone sets comes to an off-hook state in response to said first call signal received through said first selected channel after reception of said first arrival signal and the channel code of said first selected channel through said control channel.

3. A base station as claimed in claim 1, said radio telephone sets being identifiable by set codes, respectively, wherein said producing means is for making said first selected transceiver stop sending said first call signal and the channel code of said second selected channel through said first selected channel towards said radio telephone sets when said first selected transceiver receives a response signal through said first selected channel, said response signal being transmitted by one of said radio telephone sets through said first selected channel to said first selected transceiver when said one of the radio telephone sets comes to an off-hook state in response to said first call signal received through said first selected channel after reception of said first arrival signal and the channel code of said first selected channel through said control channel, said response signal comprising the set code of said one of the radio telephone sets.

4. A base station as claimed in claim 3, wherein said producing means is for producing a communication allowance signal comprising the set code of said one of said radio telephone sets to make said first selected transceiver send said communication allowance signal through said first selected channel towards said radio telephone sets after said producing means makes said first selected transceiver stop sending said first call signal and the channel code of said second selected channel through said first selected channel, said producing means being for controlling said first selected transceiver to connect said first telephone line to said one of the radio telephone sets through said first selected channel after said communication allowance signal is sent through said first selected channel towards said radio telephone sets, said producing means thereby allowing said one of the radio telephone sets to communicate a communication signal with said first telephone line through said first selected channel and said first selected transceiver when said one of the radio telephone sets receives said communication allowance signal.

5. A base station as claimed in claim 4, wherein said producing means is for making said selecting means select another of said idle transceivers as a second selected transceiver after said producing means controls said first selected transceiver to connect said first telephone line to said one of the radio telephone sets through said first selected channel, said producing means thereafter producing a second call signal to make said second selected transceiver send said second call signal through said second selected channel towards said radio telephone sets so that said second call signal is received by other telephone sets which are kept in an on-hook state among said radio telephone sets in spite of reception of said first call signal and the channel code of said second selected channel through said first selected channel after reception of said first arrival signal and the channel code of said first selected channel through said control channel and which come, in response to said communication allowance signal received through said first selected channel, to a receivable state where said second call signal can be received through said second selected channel.

6. In a radio communication network comprising a base station, first and second telephone lines, and a plurality of radio telephone sets, said base station comprising radio transceivers, and station controlling means coupled to said telephone lines for controlling said radio transceivers to connect said telephone lines to said radio telephone sets through a control channel and a plurality of communication channels which are not less in number than said telephone lines and are given channel codes, respectively, said station controlling means including selecting means coupled to said telephone lines and said radio transceivers and responsive to a first arrival signal arriving at said first telephone line for selecting one of idle transceivers among said radio transceivers as a first selected transceiver and one of idle channels among said communication channels as a first selected channel to make said first selected transceiver send said first arrival signal and the channel code of said first selected channel through said control channel towards said radio telephone sets, and producing means coupled to said telephone lines, said selecting means, and said radio transceivers and responsive to said first arrival signal for producing a first call signal to make said first selected transceiver send said first call signal through said first selected channel towards said radio telephone sets, the improvement wherein:

said producing means is furthermore for making said selecting means select another of said idle channels as a second selected channel in response to a second arrival signal arriving at said second telephone line while said first call signal is sent through said first selected channel towards said radio telephone sets, said producing means adding the channel code of said second selected channel to said first call signal to make said first selected transceiver send said first call signal and the channel code of said second selected channel through said first selected channel towards said radio telephone sets.

7. A radio communication network as claimed in claim 6, wherein said producing means makes said first selected transceiver send said first call signal and the channel code of said second selected channel through said first selected channel towards said radio telephone sets until said first selected transceiver receives a response signal through said first selected channel, said response signal being transmitted by one of said radio telephone sets through said first selected channel to said first selected transceiver when said one of the radio telephone sets comes to an off-hook state in response to said first call signal received through said first selected channel after reception of said first arrival signal and the channel code of said first selected channel through said control channel.

8. A radio communication network as claimed in claim 6, wherein said producing means is for making said first selected transceiver stop sending said first call signal and the channel code of said second selected channel through said first selected channel towards said radio telephone sets when said first selected transceiver receives a response signal through said first selected channel, said response signal being transmitted by one of said radio telephone sets through said first selected channel to said first selected transceiver when said one of the radio telephone sets comes to an off-hook state in response to said first call signal received through said first selected channel after reception of said first arrival signal and the channel code of said first selected channel through said control channel, said response signal comprising the set code of said one of the radio telephone sets.

9. A radio communication network as claimed in claim 8, wherein said producing means is for producing a communication allowance signal comprising the set code of said one of said radio telephone sets to make said first selected transceiver send said communication allowance signal through said first selected channel towards said radio telephone sets after said producing means makes said first selected transceiver stop sending said first call signal and the channel code of said second selected channel through said first selected channel, said producing means being for controlling said first selected transceiver to connect said first telephone line to said one of the radio telephone sets through said first selected channel after said communication allowance signal is sent through said first selected channel towards said radio telephone sets, said producing means thereby allowing said one of the radio telephone sets to communicate a communication signal with said first telephone line through said first selected channel and said first selected transceiver when said one of the radio telephone sets receives said communication allowance signal.

10. A radio communication network as claimed in claim 9, wherein said producing means is for making said selecting means select another of said idle transceivers as a second selected transceiver after said producing means controls said first selected transceiver to connect said first telephone line to said one of the radio telephone sets through said first selected channel, said producing means thereafter producing a second call signal to make said second selected transceiver send said second call signal through said second selected channel towards said radio telephone sets so that said second call signal is received by other telephone sets which are kept in an on-hook state among said radio telephone sets in spite of reception of said first call signal and the channel code of said second selected channel through said first selected channel after reception of said first arrival signal and the channel code of said first selected channel through said control channel and which come, in response to said communication allowance signal received through said first selected channel, to a receivable state where said second call signal can be received through said second selected channel.

* * * * *

UNITED STATES PATENT AND TRADEMARK OFFICE
CERTIFICATE OF CORRECTION

PATENT NO. : 4,860,337
DATED : August 22, 1989
INVENTOR(S) : Yukihiro SHIMURA

It is certified that error appears in the above-identified patent and that said Letters Patent is hereby corrected as shown below:

Column 2, line 31, delete "he", and insert --the--.

Column 4, line 32, after "123,", insert --...,---.

Signed and Sealed this

First Day of January, 1991

*Attest:*

HARRY F. MANBECK, JR.

*Attesting Officer*   *Commissioner of Patents and Trademarks*